No. 752,119. PATENTED FEB. 16, 1904.
S. R. STEARNS.
BREAD MAKING MACHINE.
APPLICATION FILED MAY 25, 1903.
NO MODEL.

WITNESSES:
Inventor
Sarah R. Stearns
BY
Attorneys

No. 752,119. Patented February 16, 1904.

UNITED STATES PATENT OFFICE.

SARAH R. STEARNS, OF REDLANDS, CALIFORNIA.

BREAD-MAKING MACHINE.

SPECIFICATION forming part of Letters Patent No. 752,119, dated February 16, 1904.

Application filed May 25, 1903. Serial No. 158,738. (No model.)

*To all whom it may concern:*

Be it known that I, SARAH R. STEARNS, a citizen of the United States, residing at Redlands, in the county of San Bernardino and State of California, have invented certain new and useful Improvements in Bread-Making Machines; and I do hereby declare the following to be a full, clear, and exact description of the invention, such as will enable others skilled in the art to which it appertains to make and use the same.

My invention relates to improvements in bread-making machines.

The object of my invention is to provide suitable compressing means upon a frame and also a material-support carried by said compressing means for acting in conjunction with the same.

Another object of my invention is to provide adjustable compressing means carried by a suitable frame and means for discharging material upon said compressing means when the machine is in operation.

The invention consists in rolls mounted upon a frame, a flanged material-support interposed between said rolls, and a hopper for receiving the material to be discharged upon said rolls secured upon a frame in a vertical plane with the rolls.

The invention further consists in the combination of parts and novel construction, as is hereinafter fully described, illustrated in the accompanying drawings, and more particularly pointed out in the claims hereto appended.

Figure 1:
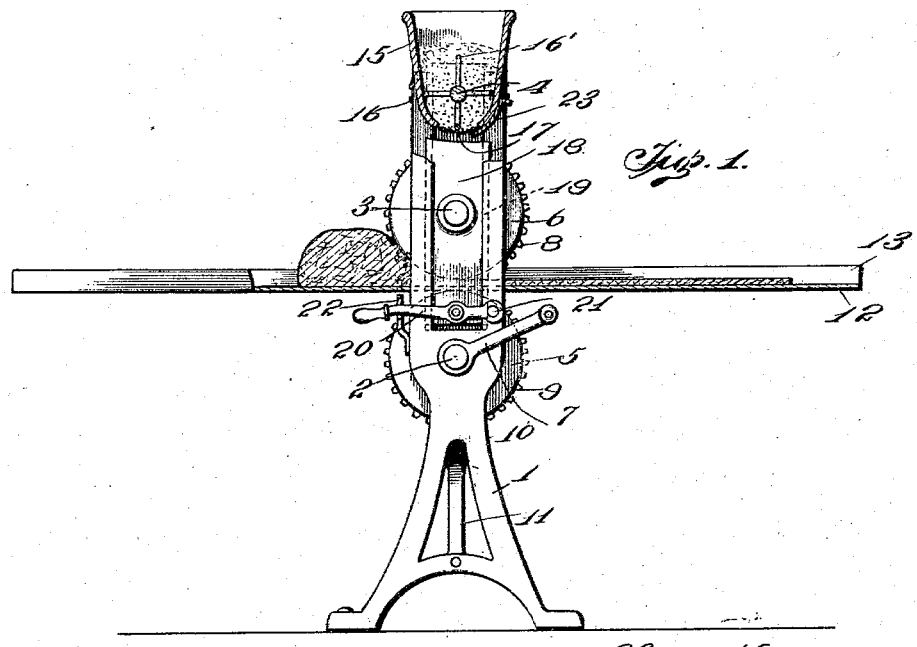
Figure 2:
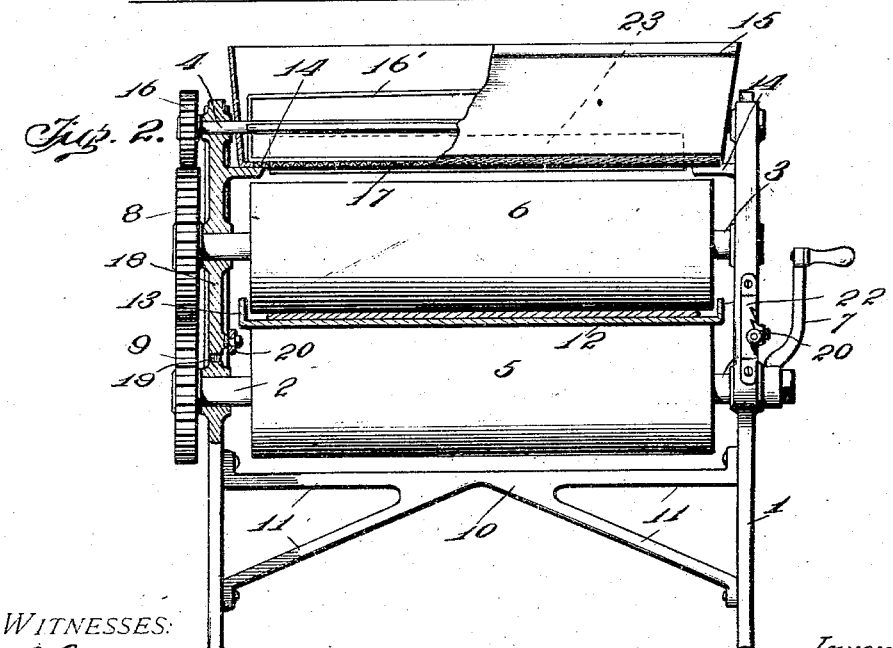

In the drawings, Figure 1 is a side elevation of the machine, showing a part of the same in cross-section. Fig. 2 is an elevated longitudinal view of the machine, showing parts of the same in cross-section.

In the embodiment of my invention I provide a suitable casing 1, upon which are journaled shafts 2, 3, and 4. Keyed to the shafts 2 and 3 are rollers 5 and 6. A suitable handle 7 is secured upon the end of the shaft 2, and upon the opposite end of said shaft 3 a gear-wheel 8 is secured thereto outside of the casing 1. The shaft 2 is extended outside of the casing 1, and a gear-wheel 9 is connected to the same and adapted to immesh with the gear-wheel 8, carried by the shaft 3. The shaft 3 is preferably journaled in a slide 18, which is adapted to move in a vertical plane in grooves 19, formed upon the casing 1. The said shaft 3, carrying the roller 6, is adapted to be limited in its vertical movement by means of a suitable lever 20, which is pivotally connected with the frame 1 at 21. Said lever 20 is adapted to engage a ratchet-bar 22, secured to the frame 1. If it is desired to adjust the rollers, it is only necessary to release the lever 20 from engagement with the ratchet-teeth upon the bar 22 and move it in the vertical plane. To permit of this, the rollers are provided with comparatively long teeth.

A suitable brace 10, having bifurcated ends 11, is secured near the base of the frame 1.

In the operation I employ a suitable pan 12, forming a support for the material which is passed between the rollers 5 and 6. The said pan 12 is provided with suitable flanged edges 13. At the upper part of the slides 18 suitable extensions 14 for receiving and retaining the hopper or receptacle 15, which is adapted to receive the flour or suitable material, are placed. The shaft 4, journaled in the slides 18, which are mounted upon the casing 1, passes through the said receptacle 15, and upon one of its ends a gear-wheel 16 is keyed and adapted to immesh with the gear-wheel 8, carried by the shaft 3. Inside of the hopper 15 a suitable wire frame 16' is secured to the shaft 4, forming an agitator for stirring or agitating the material contained in the hopper 15. Said hopper is provided with perforations at the bottom thereof, or, as preferably employed in my construction, an elongated slot is formed upon the hopper and a suitable screen 17 inserted therein. Upon the hopper 15 is secured a slide 23, which is adapted to limit or gage the amount of flour or like material which is to be discharged upon the rolls and the material-support when the machine is in operation. This slide is secured upon the said hopper 15 by suitable guides formed upon the said hopper.

In operation the rollers are actuated by suitable power imparted to the shaft 2, which in turn imparts motion to the gear-wheels 8 and 16. The substance to be rolled is placed upon the pan, and the said pan is passed through the rollers 5 and 6. Simultaneous with the imparting of motion through shaft 3 the agitator in the hopper 15 is adapted to discharge the flour or suitable material contained therein upon the rollers. The advantage of providing the machine with a suitable flanged support for material which is to be passed through the same is that it prevents the dough from extending over beyond the rolls and in engaging the casing or gear-wheels. The discharging means carried above the rollers prevents the material which is passed through the machine from adhering to the rollers by the sprinkling of the said rollers with the material contained in the hopper 15.

I reserve the right to make detail alterations in the construction of the machine which will come within the scope of my invention.

Having thus fully described my bread-making machine, what I claim as new, and desire to secure by Letters Patent, is—

1. A bread-making machine comprising a frame, a roll journaled thereon, a roll and a discharge mechanism mounted upon the said frame and simultaneously adjustable.

2. In a device of the character described, the combination of a frame, rolls journaled thereon, one of said rolls journaled in vertical sliding plates carried upon the said frame, a hopper secured to said plates above the rolls, said hopper provided with a slide for limiting the discharge of the material therefrom, an agitator mounted within the said hopper and means carried by said agitator and assembled with said rolls for simultaneously actuating said rolls and agitator.

3. In a device of the character described, the combination with a frame, of an adjustable roll and a fixed roll journaled upon the said frame in a vertical position, a flanged material-support removably secured between said rolls, a discharge mechanism carried above said rolls and provided with a solid slide for gaging the amount of material to be discharged therefrom, said adjustable roll journaled in a slide carried upon the frame, a ratchet formed upon said frame, a lever pivotally secured to said slide and adapted to engage said ratchet when said slide is in a locked position.

4. In a device of the character described, the combination with a frame, of a bifurcated brace secured to said frame near the bottom thereof, slides mounted upon said frame, a roller positively mounted upon the frame, a roller and a discharge mechanism secured to the slides and adjustable simultaneously into a relative position upon the frame and a material-support adapted to be passed through the said rollers.

5. In a bread-making machine, the combination with a frame, of a roller rotatably mounted upon said frame, slides removably mounted upon the frame, a roller journaled upon said slides, a hopper carried by said slides, means for adjusting the said slides simultaneously, and means for actuating the rolls.

6. In a bread-making mechanism, the combination with an upright frame, of a bifurcated brace secured near the base thereof, a pair of slides detachably secured to said frame, a roll fixed to the frame, a roll and a hopper secured to said slides, levers pivotally secured to the frame and engaging the slides, means for locking said lever in a fixed position upon the frame, and means for imparting motion to the rolls.

7. In a bread-making mechanism, the combination with a frame, of a roll fixed to said frame, a roll journaled upon slides, mounted upon said frame, a bracket secured to the slides, a hopper mounted upon said bracket, levers and ratchet-bars connected with said slides and the frame for retaining the roll carried by the slides and the hopper in a relative position to the roll carried by the frame.

8. In a bread-making mechanism, the combination with a frame, of a brace secured near the bottom thereof, grooves formed upon said frame, slides mounted within said grooves, a bracket secured upon each slide, a roll journaled upon the frame, a roll and a hopper secured to the slides, a solid gage carried by the hopper, an agitator journaled upon the hopper and provided with horizontal-extending members, and means connected with the casing and the slides for simultaneously adjusting the roll carried by the slide and the hopper in respect to the position of the roll journaled upon the casing.

9. In a bread-making mechanism, the combination with a casing, of a roll journaled upon aid casing, slides detachably secured to the casing, a roll and a discharge mechanism carried by the slides, and means for vertically adjusting the last-mentioned roll and the discharge mechanism independently of the roll journaled upon the casing.

10. A bread-making machine comprising a frame, rolls rotatably mounted upon said frame, one of said rolls and a discharge mechanism slidably mounted thereon, said roll and discharge mechanism provided with means for simultaneously adjusting the same in a vertical position, said discharge mechanism comprising a hopper having a perforated bottom and a slide arranged upon said hopper, an agitator mounted within said hopper comprising a shaft and a series of parallel members fixed to said shaft and means carried by said rolls and said agitator for imparting motion to said members.

In testimony whereof I hereunto affix my signature in presence of two witnesses.

SARAH R. STEARNS.

Witnesses:
  LEANDER W. STEARNS,
  Mrs. L. H. BENNETT.